Patented Sept. 5, 1939

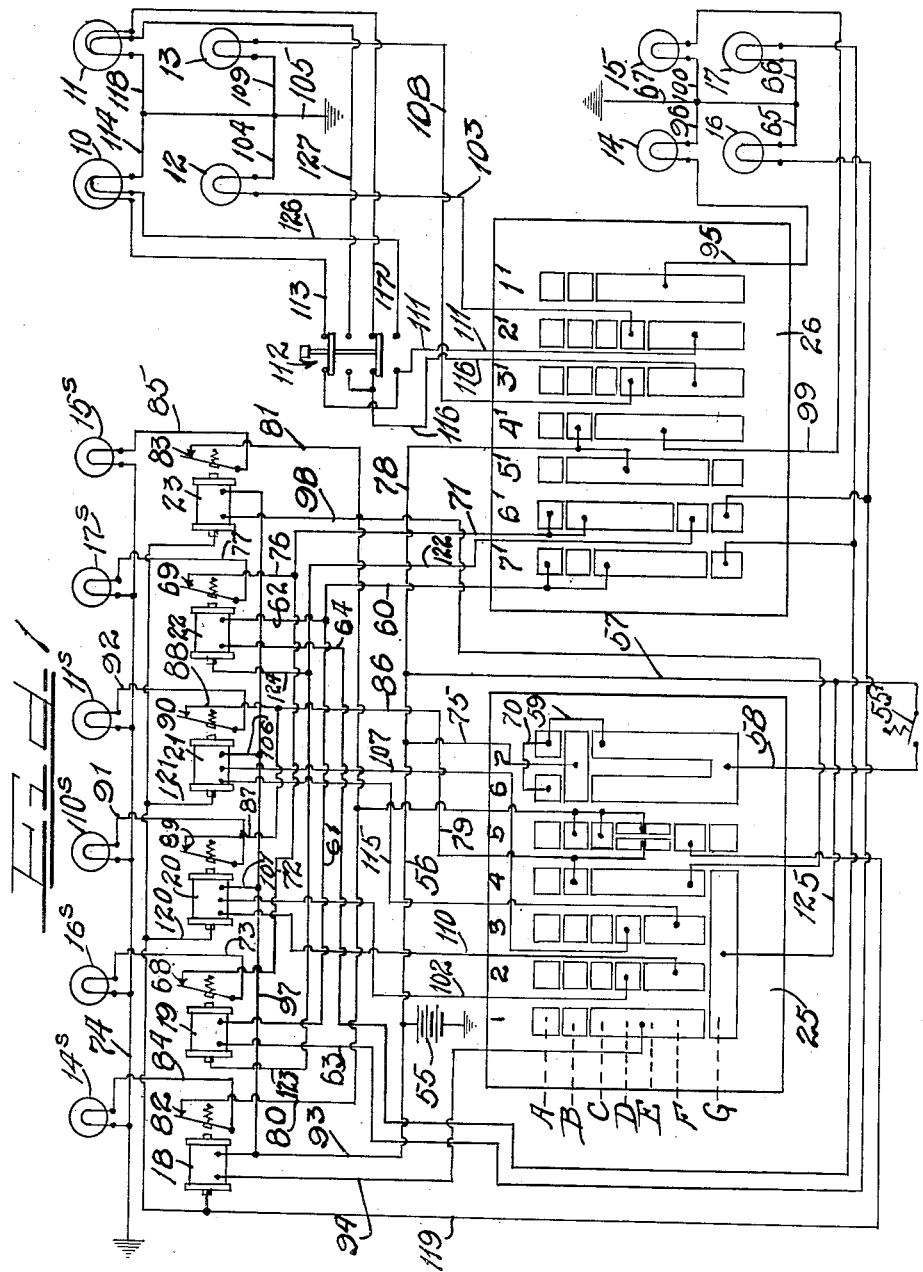

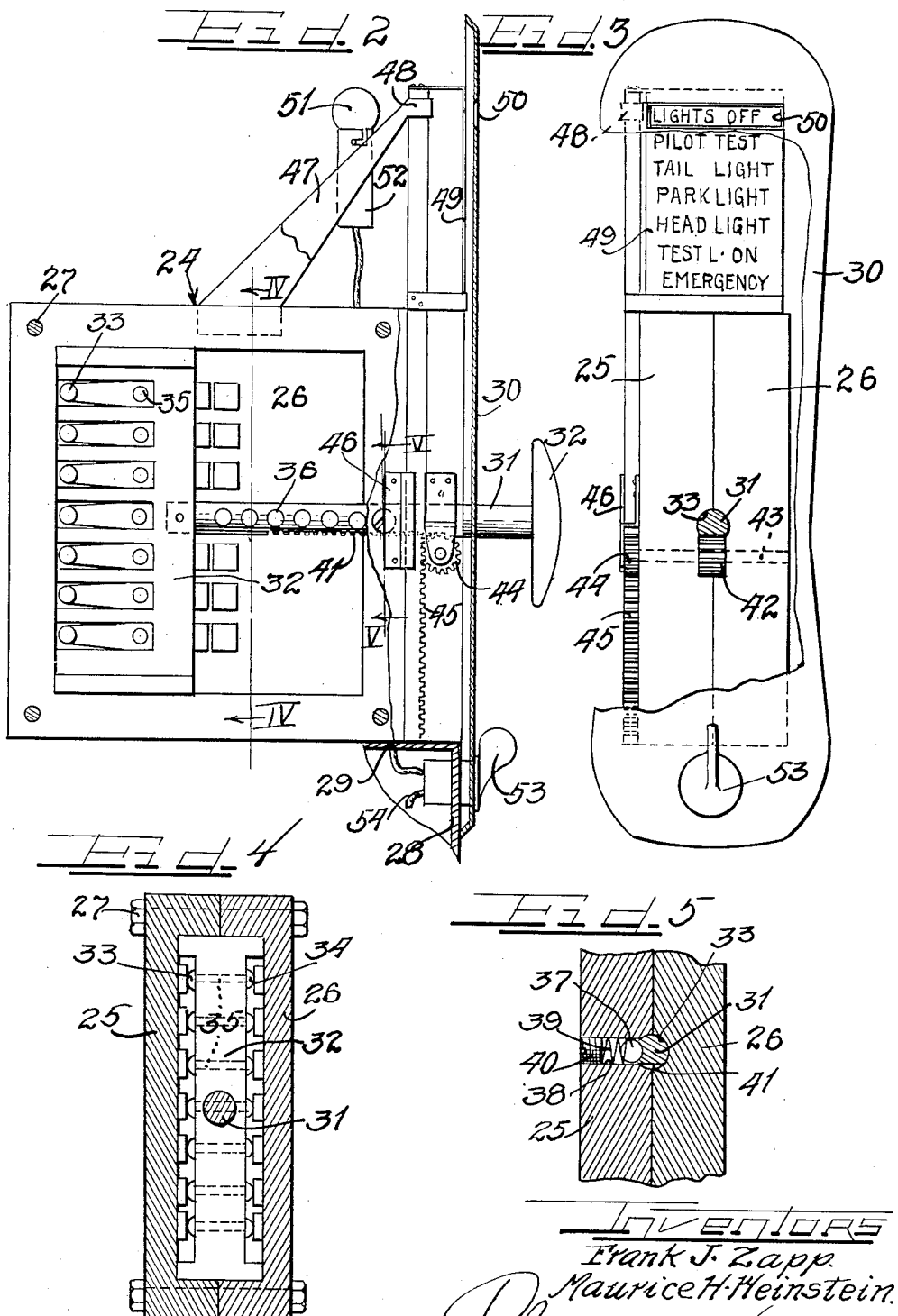

2,171,822

UNITED STATES PATENT OFFICE 2,171,822

INDICATING SWITCH

Frank J. Zapp and Maurice H. Weinstein, Chicago, Ill.

Application May 5, 1937, Serial No. 140,790

4 Claims. (Cl. 200—167)

The present invention relates in general to improvements in a signal system and more specifically is concerned with the provision of improved signal and switching devices whereby the improved system may be practiced.

The signal system described herein is especially useful in connection with the lighting circuits of a vehicle, such as an automobile for positively indicating to the operator the condition of the respective circuits. For example, the use of the herein described system will enable the operator to know whether the headlights, tail lights, etc., are in proper working order, and will instantly indicate to the operator the burning out of a headlight bulb, tail light bulb or other bulb in the system. Moreover, if the circuit of one of these bulbs should become opened for some reason, or otherwise inoperative, such condition will at once be indicated to the operator of the vehicle.

Signal systems for this general purpose have heretofore been utilized, but these systems have been unreliable due to the lack of proper means for conveniently and readily testing the signal system. In other words for a signal system to give a reliable indication, the signal system itself must be in perfect condition.

In addition to the means for electrically indicating the condition of the respective circuits, it is also proposed to provide novel and improved switching means for controlling the various circuits; and in order that an operator may be apprised of the various settings of the switching means with reference to the circuit being controlled thereby, a novel mechanically actuated indicating means is provided.

With the foregoing in mind, the present invention seeks to provide a signal system wherein the different lighting circuits may be readily tested, as well as the signal circuits and devices, whenever desired.

A further object of the invention is to provide an improved signal system for automobiles, and the like, wherein the signal system may be tested irrespective of whether the lighting circuits of the vehicle are "on" or "off".

As an additional feature of the invention, it is proposed to provide a signal system which may be readly connected and disconnected relative to the lighting circuits, whereby the lighting circuits may be selectively operated in the usual manner or with the signal system in operation, as desired.

It is still another object to provide an improved relay of such construction as to be particularly adapted for a signal system such as described herein.

A still further object is to provide in connection with such a system, improved and simplified switching and indicating means therefor.

Other objects and features of the invention will more fully appear from the following detailed description, taken in connection with the accompanying drawings, which illustrate a single embodiment thereof, and in which:

Figure 1 is a view schematically showing the electrical connections of the various devices embodied in the signal system of the present invention;

Figure 2 is an enlarged view showing the association of the control switch mechanism with an escutcheon plate and details of the switch parts and mechanical indicating mechanism;

Figure 3 is an enlarged fragmentary view of the same, looking toward the escutcheon plate, portions being cut away to show details of the mechanical indicating mechanism;

Figure 4 is an enlarged transverse sectional view through the switch mechanism, taken substantially on line IV—IV of Figure 2; and Figure 5 is a fragmentary sectional view showing the detent means associated with the switch operating handle, taken substantially on line V—V of Figure 2.

As shown on the drawings:

The signal system of the present invention is illustrated as being applied to the lighting system of a vehicle, such as an automobile. In general it is proposed to provide novel switch means which may be mounted on the dash or other convenient place of an automobile where it may be readily accessible to the operator. This switch is so arranged that it not only controls the energization of the main lights of the automobile, but also controls through suitable relays main light signal devices such as small signal lamps. These signal devices are arranged to indicate to the operator that the circuits of the respective main lamps are operating properly. Also, in the event that any main lamp should be burned out or the circuit therefor become opened for any reason, the proper signal associated with that lamp will indicate such condition to the operator.

Referring to Figure 1, the main lamps of the system are illustrated as comprising a main left headlight 10, a right headlight 11, a left parking light 12, a right parking light 13, a left tail light 14, a right tail light 15, a left tail side light 16, and a right tail side light 17.

The signal lamps corresponding to the main lamps of the system are indicated by similar numerals, except that in each case the numeral is accompanied with the superscript letter s. For example, the left tail light bears a numeral 14, and its corresponding signal light bears the numeral 14$^s$.

The signal lights are respectively controlled through the contacts of relays 18 to 23 inclusive, and the operating coils of these relays are so interconnected with the main lamp circuits that, when the main lamps are burning, the relay coils in circuit with the lamps will be energized.

Control of the main lamps, and consequently the relays in the main lamp circuits, is accomplished by means of a novel manually operable control switch as generally indicated at 24.

This switch is provided with a substantially rectangular housing of hollow construction, which is defined by complementary housing members 25 and 26 which may be secured into cooperative association by means of corner screw bolts 27 provided with suitable nuts for clamping the frame members together.

The housing is supported in the rear of the automobile dash, as indicated at 28, or in some other convenient location where the switch may be easily operated by the driver of the car. The housing may be supported on an appropriate bracket or, if desired, the dash may be provided with a suitable opening for the switch housing, and the dash material at the lower edge of the opening bent rearwardly as shown at 29 to form a support for the housing.

An escutcheon plate 30 is secured to the dash in any appropriate manner so as to extend over the front of the switch housing. This escutcheon plate is provided with a suitable opening through which a switch operating rod 31 is extended, this rod being provided with a button 32 which may be easily grasped by the operator when it is desired to shift the actuating rod forward or backward to manipulate the switch.

The forward side of the switch housing is apertured as shown at 33 to receive the operating rod 31 therethrough. Inside the housing, the operating rod is connected at its end to an I-shaped block 32 which is slidingly supported within the hollow cavity of the housing for sliding movement between the forward and rear portions of the interior cavity of the housing.

The block 32 serves as a carriage for a row of vertically aligned and vertically spaced spring mounted contacts 33 disposed on one side of the block and a similar row 34 disposed on the opposite side of the block. Each contact 33 is electrically connected to the contact 34 on the opposite side of the block by means of a through pin or rivet 35 by means of which the contact springs are secured to the block.

The interior confronting faces of the frame members 25 and 26 are respectively provided with a plurality of rows and tiers of contact segments which effect in each case a stationary contact grid arrangement, wherein the contacts on the grid associated with frame member 25 are arranged to be engaged by contacts 33, and the contacts on frame member 26 are arranged to be engaged by the contracts 34 as the block 32 is shifted forwardly and backwardly by means of the switch operating rod 31.

As shown in Figure 1, the rows of contacts on frame member 25 are numbered 1, 2, 3, 4, 5, 6 and 7 respectively, and the rows on frame member 26 are numbered 7', 6', 5', 4', 3', 2', and 1'. As disposed in the switch, the rows 1 and 1' will be disposed oppositely each other and the rows of the respective grids will be similarly disposed.

The switch handle is arranged so that it may be moved to bring the movable contacts 33 and 34 into the respective positions A, B, C, D, E, F, and G in going from the back of the switch housing to the front thereof, these positions corresponding to the confronting tiers of contacts on the two contact grids.

With this arrangement, when the movable contacts are in position A, the segments located by the coordinates passing through A and 1 as shown in Figure 1, would be connected by a set of movable contacts 33 and 34 to the segments located by the coordinates A—1'. This method of locating the serments in describing the electrical connections of the switch in the system will be utilized in the further description of the system.

In order to be assured that the movable contacts 33 and 34 will be stopped on the respective positions of the switch, the operating rod 31 is provided with a series of spaced depressions 36 along one side. Cooperatively associated with the rod is a ball detent 37 which is mounted in an appropriate socket 38 in the frame member 25. This ball detent is forced toward the rod by means of a spring 39 which is disposed in the socket with one end against the ball and its other end in engagement with a screw plug 40 for closing the outermost end of the socket.

The respective positions of the switch are mechanically indicated. This is accomplished by forming the lower portion of the operating rod 31 with suitable teeth 41 to form a rack. This rack has its teeth meshing with a pinion 42 which is mounted on a rotatable shaft 43 in the housing frame members 25 and 26. One end of this shaft extends to the exterior of the housing and is provided with a corresponding pinion 44 which meshes with a vertically disposed rack 45. This latter rack is mounted for vertical movement and is held in operative relationship with the pinion 44 by means of a guide bracket 46 mounted on the housing.

The rack member 45 is extended upwardly and carried through a suitable bracket guide 47 supported on the top of the housing and arranged with one end, as shown at 48, in sliding engagement with the rack member.

The uppermost end of the rack member 45 carries a small panel 49 which is adapted to move upwardly and downwardly behind a window 50 in the escutcheon plate.

The panel 49 is provided with suitable indicia so as to indicate the various positions of the switch and to apprise the operator of the results to be accomplished by actuating the switch to the various positions. For example, the various positions of the switch, namely A, B, C, D, E, F, and G as shown in Figure 1, are correspondingly identified by the respective indicia "Lights Off", "Pilot Test", "Tail Light", "Park Light", "Head Light", "Test Lights On", and "Emergency".

Although the panel 49 may be constructed of most any material, it is preferred that this panel be made of a translucent material in order that a suitable illuminating medium may be placed behind the panel to make the indicia thereon more readily discernible through the window 50. For this purpose, a lamp 51 may be mounted in an appropriate socket 52 behind the panel 49, this socket being supported on the bracket 47.

As a convenience to the operator, a switch 53 is mounted on the escutcheon plate below the operating rod 31. A supply circuit from a suitable source of supply is carried through a conductor 54 to the switch and thence to the socket 52, thus enabling the lamp 51 to be lighted or extinguished as desired by the operator.

The operation of the signal system for each position of the switch will now be discussed.

"*Lights Off*": When the switch is on this position, the main lights and signal lights will all be out. It is desirable, however, on this position of the switch to provide means for properly lighting the left and right tail side lights when the brake lever is depressed to slow down or bring the automobile to a stop. In order to accomplish this result, a switch 55' is provided, this switch being normally in open position and arranged to close when the brake lever is depressed.

Assuming that the switch 55' is closed, relays 19 and 22 will have their operating coils energized through the following circuit: From one side of a battery 55 through conductor 56, conductor 57, switch 55', conductor 58 to contact point G—7 thence through the segment to point C—7, through connection 59, from contact point A—7 to contact point A—7', through conductor 60 where the current divides into two parallel circuits comprising respectively conductors 61 and 62, relay coils 19 and 22, conductors 63 and 64, to the left and right tail side light, thence through conductors 65 and 66 to a common conductor 67 which is grounded to complete a circuit back to the other side of battery 55.

The relays 19 and 22 being energized, their normally closed contacts 68 and 69 are opened. The left and right tail side lights are thus energized so long as the brake switch 55 is maintained closed during the braking operation.

Should either of the lamps 16 or 17 be burned out or their circuits opened for some reason, the relay in the circuit of the damaged lamp will not be energized. Under this condition the armature will not be attracted and the normally closed contacts of the relay will remain closed and complete a circuit to energize the appropriate signal lamp, whereby the operator will be apprised of the failure of the tail side light to operate properly. For example, let it be assumed that the left tail side light 16 is burned out. Relay 19 will not be energized and contacts 68 thereof will remain closed to energize the following circuit: From one side of battery 55, through conductor 56, conductor 57, switch 55', conductor 58, from segment point G—7 to segment point C—7, thence through conductor 59, to conductor 70, to contact point A—6, through a set of contacts 33 and 34 to contact point A6' through conductor 71, conductor 72, contacts 68, conductor 73, to one side of signal lamp 16s, from the other side of this lamp to grounded conductor 74, and thence through the ground circuit to the other side of battery 55.

In a like manner, signal lamp 17s would be energized in the event that the right tail side light should have its circuit opened.

"*Pilot Test*": On this setting of the switch, corresponding to position B as shown in Figure 1, all the signal lights are energized, thus assuring the operator that the signal circuits are functioning properly. Since this is only a temporary operating position of the switch, it is not necessary to arrange for any indication during the operation of the braking mechanism.

In this position of the switch, signal lamps 16s and 17s are energized through the following circuit: From one side of battery 55, through conductor 56, conductor 75 to contact points B—6 and B—7, thence to contact point B—6', conductor 71, thence through parallel circuits respectively comprising conductors 72 and 76, relay contact points 68 and 69, conductors 73 and 77 respectively to lamps 16s and 17s, to grounded conductor 74 and thence through the ground circuit back to the other side of battery 55.

Signal lamps 14s and 15s are energized through the following circuit: From one side of battery 55, through conductor 56, conductor 78 to contact B—5', thence to contact B—5, through conductor 79 which is connected to parallel circuits comprising respectively conductors 80 and 81, through relay contacts 82 and 83 respectively, conductors 84 and 85 to signal lamps 14s and 15s and thence back to grounded conductor 74 which completes the circuit through ground back to the other side of the battery 55.

Signal lamps 10s and 11s are energized through the following circuit: From one side of battery 55, through conductor 56, conductor 78, to contact point B—4', thence to contact point B—4, conductor 86, through parallel circuit comprising conductors 87 and 88, to relay contacts 89 and 90, conductors 91 and 92 respectively to signal lamps 10s and 11s, thence through conductor 74 which completes the circuit through ground back to the other side of battery 55.

"*Tail Light*": This position of the switch corresponds to the position C as shown in Figure 1.

The right and left tail light, that is, bulbs 14 and 15 will be lighted on this position of the switch through the following circuits: From one side of battery 55, through conductor 93, through the operating coil of relay 18, conductor 94 to contact point C—1, thence to contact point C—1', to conductor 95, lamp 14, conductor 96 to grounded conductor 67 and thence through the ground circuit back to the other side of the battery. Lamp 15 is energized from one side of battery 55 through conductor 93, conductor 97 to the operating coil of relay 23, through conductor 98 to contact point F—4, from contact point C—4 to contact point C—4', thence through conductor 99 to tail lamp 15, through conductor 100 to grounded conductor 67 and thence through the grounded circuit to the other side of the battery.

While the switch is set for operating the tail light, it will be noted that contact points C—5 and C—5' are interconnected to establish a circuit through the contact points 82 and 83 respectively of relays 18 and 23 to the signal lamps 14s and 15s. So long, however, as the relays 18 and 23 are energized, the signal lamps will not be lighted, but should the tail light circuit be impaired for any reason, the relays 18 and 23 would be de-energized to close the circuits on the signal lamps. This would apprise the car operator that something is wrong with the tail light lamp circuit.

"*Park Light*": When it is desired to have the parking lights energized in addition to the tail lights, the switch is moved to position D as shown in Figure 1.

The relay 20 is energized and the left parking light is also energized through the following circuit: From one side of battery 55, through conductor 93, conductor 97, conductor 101, through the operating coil of relay 20, through conductor 102, to contact point D—2, thence to contact point D—2', conductor 103 to lamp 12, conductor 104, to grounded conductor 105, and thence through the ground circuit back to the other side of the battery.

Relay 21 is also energized and right parking lamp energized from one side of battery 55, through conductor 93, conductor 97, conductor 106, through the operating coil of relay 21, conductor 107 to contact point D—3, thence to contact point D—3', conductor 108 to right parking light 13, conductor 109 to grounded conductor 105, thence through the ground circuit back to the other side of battery 55.

Through the connection of contact point D—5' with the spaced contact points at D—5, the circuit through the signal lamps 14ˢ, 15ˢ, 10ˢ, and 11ˢ will be competed upon the de-energization of the relays connected with the corresponding main lamps or energized due to anyone of the main lamp circuits being interrupted.

"*Head light*": On this point of the switch which corresponds to position E as shown in Figure 1, the tail lights remain lighted, the parking lights are extinguished and the headlights lighted in their stead. It will be observed that the operating coils of relays 20 and 21 are utilized for both the head light and parking light signal lamp operation. In other words, one lamp is used to indicate for one of the head lights and also to indicate for one of the parking lights. This is accomplished by providing a two-section operating coil on the relay, one of these sections being of low resistant wire and the other section of high resistant wire. When the head light is energized, the relay will be energized through the section having low resistant wire, whereas when the parking light is energized the relay will be energized through both coil sections in series. Thus, a single relay is used for two main lights.

At this position of the switch, the tail light relay circuit and also the indicating circuit for the tail light signal lamps are maintained.

The left headlight will be energized from one side of battery 55 through conductor 93, conductor 97, conductor 101, through the operating coil of relay 20, conductor 110 to contact point E—2, thence to contact point E—2', conductor 111, through closed contacts on dimmer switch 112, conductor 113 to the high filament on the left headlight, through conductor 114 to the grounded conductor 105, thence through the ground connection to the other side of battery 55.

The right headlight is energized through a circuit from one side of battery 55, conductor 93, conductor 97, through conductor 106 to the operating coil of relay 21, thence through conductor 115 to contact point E—3, thence to contact point E—3', conductor 116, through closed contacts on dimmer switch 112, thence through conductor 117 to the high filament on the right headlight, through conductor 118 to grounded conductor 105 and thence through the ground circuit back to the other side of the battery.

"*Test Lights On*": This position of the switch, which corresponds to position F as shown in Figure 1, all the test lamps are energized. It is therefore not necessary for the operator to return the switch to the "Pilot test" position in order to test the signal lamps, but may easily test these lamps by shifting the switch to the next position which corresponds to position F in Figure 1.

In this position of the switch, and since all the main lamps are energized, the relays will likewise be energized. Normally open circuits are established through the cores of these relays to energize the signal lamps. The left and right headlight signal lamps are energized through the following circuit: From one side of battery 55 through conductor 56, conductor 78, to contact point F—5', thence to contact point F—5, through conductor 119, thence in parallel through conductors 120 and 121 respectively, the cores of relays 20 and 21 respectively, through conductors 91 and 92 respectively to lamps 10ˢ and 11ˢ, thence to grounded conductor 74 through which the circuit is completed to the other side of battery 55.

In order to energize the signal lamps 16ˢ and 17ˢ, it is necessary to press the brake lever in order to close switch 55'. Closing of this switch causes the left tail and right tail side lights to be energized through the following circuit: From one side of battery 55, through conductor 56, conductor 57, contacts of switch 55' conductor 58, to switch contact point F—6, thence to switch contact point F—6', conductor 122, through parallel conductors 123 and 124, the cores of relays 19 and 22 respectively, thence through conductors 73 and 77 respectively to the signal lamps 16ˢ and 17ˢ, thence to the grounded conductor 74 which completes the circuit through ground back to the other side of the battery.

Signal lamps 14ˢ and 15ˢ are energized through the following circuit: From one side of battery 55, through conductor 56, conductor 78, contact switch point F—5', thence to contact switch point F—5, conductor 119, through parallel connections through the cores of relays 18 and 23, conductors 84 and 85 respectively, to lamps 14ˢ and 15ˢ and thence to grounded conductor 74 by means of which the circuit is completed through ground back to the other side of the battery.

"*Emergency*": This position of the switch corresponds to position G as shown in Figure 1. This position of the switch cuts out the signal system completely and directly energizes the main lamps.

On this connection of the switch, the circuit for the headlights and tail lights is from one side of battery 55, conductor 56, conductor 57, conductor 125 which is common to contact points G—1, G—2, G—3 and G—4, these contact points being respectively connected to contact points G—1', G—2', G—3', and G—4', which feed the headlight and tail light.

Contact points G—6 and G—7, which are connected through switch 55 to the battery, are connected respectively to contact points G—6' and G—7' which feed the tail side lights and will energize them whenever the switch 55' is closed.

Whenever the headlights are connected in the circuit, the dimmer switch 112 may be utilized to connect the low filaments of the headlights into the circuit. When switch 112 is depressed, conductor 111 is connected to a conductor 126 which completes the circuit through the low filament of the left headlight. Also, conductor 116 is connected through a conductor 127 to energize the low filament of the right headlight.

From the foregoing description, it will be apparent the present invention provides an improved signal system for indicating the condition of the main lighting circuits of a vehicle; in which the different lighting circuits may be readily and conveniently tested, irrespective of whether the main lights are on or off; which embodies a novel switch arrangement for not only controlling the electric signals but also mechanically indicating the positions of the switch; a system which may readily be disconnected so that the main lighting circuit may be operated without the signal lamps; and which is simple in operation and gives improved operating characteristics.

It is of course, to be understood that although we have described in detail a single embodiment of our invention, the invention is not to be thus limited but only insofar as defined by the scope and spirit of the appended claims.

We claim as our invention:

1. A control and indicating unit for a vehicle lighting system adapted to be mounted on a vehicle dash, said unit comprising a switch, a switch actuating handle mounted for longitudinal shifting movements in opposite directions, an indicating member mounted for straight line movements in opposite directions, a rack and pinion connection between said members, and detent means providing spaced dwell points in the movement of said handle.

2. A multi-position control switch comprising a switch operating member movable in opposed directions and arranged during movement in each direction to actuate the switch through a plurality of operating positions, a first rack movable with said member, a movably mounted member having indicia thereon for indicating the switch positions, a second rack movable with the latter member, and pinion means for transmitting the movements of the first rack to the second rack.

3. A multi-position control switch comprising a push-pull switch operating member arranged in each direction of its movement to actuate the switch through a plurality of operative positions, a first straight rack movable with said member, a movably mounted member having indicia thereon for indicating the switch positions, a second rack movable with the latter member, said racks being disposed at an angle to each other, and a pinion connection between said racks, whereby movement of the first rack is transmitted to the second rack.

4. Control switch means comprising an elongate switch actuating member mounted for axial movement, teeth on said member defining a rack, a movably mounted member having indicia thereon for indicating the switch positions, a second rack movable with the latter member, a rotatable shaft extending transversely of said racks, and pinion means carried by said shaft meshing with said racks.

FRANK J. ZAPP.
MAURICE H. WEINSTEIN.